(12) United States Patent
Yamamoto

(10) Patent No.: US 10,432,830 B2
(45) Date of Patent: Oct. 1, 2019

(54) IMAGE PICKUP APPARATUS HAVING PLURALITY OF EXTERNAL CONNECTION TERMINALS

(71) Applicant: CANON KABUSHIKI KAISHA, Tokyo (JP)

(72) Inventor: Kazuo Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/392,930

(22) Filed: Apr. 24, 2019

(65) Prior Publication Data

US 2019/0253586 A1    Aug. 15, 2019

Related U.S. Application Data

(63) Continuation of application No. 16/115,971, filed on Aug. 29, 2018, which is a continuation of application No. 15/281,743, filed on Sep. 30, 2016, now Pat. No. 10,091,401.

(30) Foreign Application Priority Data

Oct. 14, 2015 (JP) ................................. 2015-202785

(51) Int. Cl.
  *H04N 5/225* (2006.01)
  *H04N 7/10* (2006.01)
  *G03B 17/02* (2006.01)
(52) U.S. Cl.
  CPC ........... *H04N 5/2252* (2013.01); *G03B 17/02* (2013.01); *H04N 5/2251* (2013.01); *H04N 7/10* (2013.01)
(58) Field of Classification Search
  CPC .................................................. H04N 5/2252

USPC .......................................................... 348/376
See application file for complete search history.

(56) References Cited

U.S. PATENT DOCUMENTS 7,489,849 B2 *   2/2009   Reagan ................ G02B 6/4466
                                                                   385/135
2005/0175307 A1   8/2005   Battey et al.

FOREIGN PATENT DOCUMENTS

JP          2007-053426 A       3/2007

OTHER PUBLICATIONS

Canon KF105 Instruction Manual, http://downloads.canon.com/cpr/software/video/Canon_XF100_XF105_Instruction_Manual.pdf (Dec. 6, 2010), pp. 1-15.

* cited by examiner

*Primary Examiner* — Joel W Fosselman
(74) *Attorney, Agent, or Firm* — Venable LLP

(57) ABSTRACT

An image pickup apparatus that prevents hooking of a cable, coming-off of a connector, or the like without lowering insertion and extraction performance of a cable even when external connection terminals are arranged on inclined faces formed on a side surface of an apparatus main body in its width direction while reducing a size of the apparatus main body in the width direction. The inclined faces inclines such that ends of the respective inclined faces on a back side of the apparatus main body are inclined in a direction to come close to the optical axis. The inclined faces are arranged at positions so as not to overlap to each other when viewed from the width direction of the apparatus main body, and are arranged such that a part of the inclined faces overlap to each other when viewed from a direction of the optical axis.

9 Claims, 5 Drawing Sheets

IMAGE PICKUP APPARATUS HAVING PLURALITY OF EXTERNAL CONNECTION TERMINALS

This application is a continuation of application Ser. No. 16/115,971 filed Aug. 29, 2018, which is a continuation of application Ser. No. 15/281,743 filed Sep. 30, 2016, U.S. Pat. No. 10,091,401 B2.

BACKGROUND OF THE INVENTION

Field of the Invention

The present invention relates to an image pickup apparatus such as, for example, a digital video camera for professional-use, and specifically to an image pickup apparatus having a plurality of external connection terminals.

Description of the Related Art

In a digital video camera for professional-use or the like, connectors are often arranged on a back side of a camera main body to prevent the connectors to which cables are connected from being broken because shooting is performed in a state where the camera main body to which the cables are connected is carried on a shoulder of a moving person.

However, a recent digital video camera for professional-use has developed in multiple functionality, so that a connector for performing high speed communication, a connector for performing IP communication, or the like are provided on the camera main body, resulting in increase of the number of connectors. The image pickup apparatus is disclosed in which connectors are arranged on a side surface of a camera main body since it impossible to arrange all of the connectors on a back side of the camera main body. (Japanese Laid-Open Patent Publication (kokai) No. 2007-53426).

However, when the number of the connectors is increased due to further multiple functionality of the camera, and when the connectors are arranged on the side surface of the camera main body, for example, detachment of the connector due to hooking of a cable is likely to occur when the camera main body is carried on a shoulder of a moving person.

On the other hand, making all of the connectors be arranged on the back surface part of the camera main body leads to further increase in size of the camera main body in its width direction, resulting in a shape unsuitable for a digital video camera for professional-use of a shoulder carry type.

SUMMARY OF THE INVENTION

The present invention provides an image pickup apparatus that prevents hooking of a cable, coming-off of a connector, or the like without lowering insertion and extraction performance of a cable into and from an external connection terminal even when a plurality of external connection terminals is arranged on a side surface of an apparatus main body in its width direction while reducing a size of the apparatus main body of the image pickup apparatus in the width direction.

Accordingly, the present invention provides an image pickup apparatus comprising a plurality of inclined faces formed on a side surface in a width direction of an apparatus main body perpendicular to an optical axis of a lens part which is provided on the image pickup apparatus, the plurality of inclined faces being inclined such that ends of the respective inclined faces on a back side of the apparatus main body are inclined in a direction to come close to the optical axis of the lens part, and a plurality of external connection terminals provided on the respective plurality of inclined faces, wherein the plurality of inclined faces are arranged at positions so as not to overlap to each other when viewed from the width direction of the apparatus main body, and are arranged at a position such that at least a part of the inclined faces overlap to each other when viewed from a direction of the optical axis of the lens part.

The present invention makes it possible to prevent hooking of a cable, coming-off of a connector, or the like without lowering insertion and extraction performance of a cable into and from the external connection terminal even when the plurality of external connection terminals is arranged on the side surface of the apparatus main body in the width direction while reducing the size of the apparatus main body of the image pickup apparatus in the width direction.

Further features of the present invention will become apparent from the following description of exemplary embodiments (with reference to the attached drawings).

DESCRIPTION OF THE EMBODIMENTS

Hereinafter, an example of an embodiment of the present invention will be described with reference to the drawings.

Figure 1:
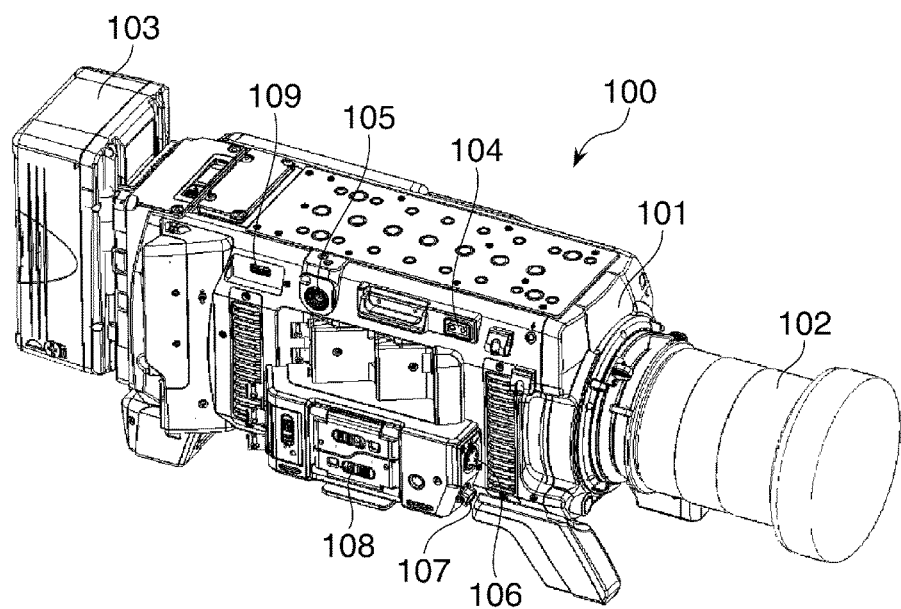
FIG. 1 is a perspective view of a digital video camera for professional-use that is an example of an embodiment of an image pickup apparatus of the present invention as viewed from a front side thereof.
Figure 2:
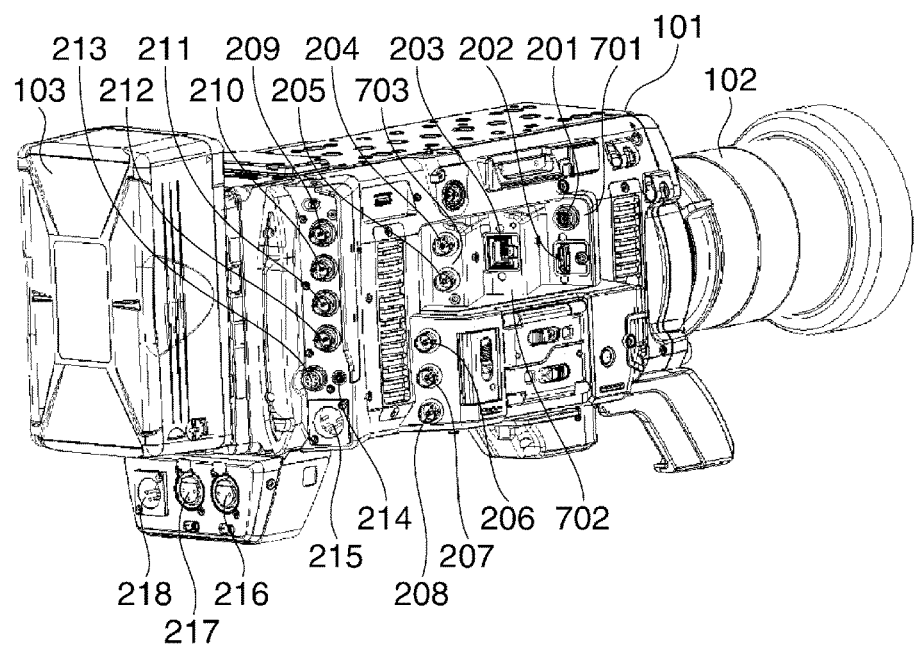
FIG. 2 is a perspective view of the digital video camera for professional-use shown in FIG. 1 as viewed from a back side thereof.

FIG. 1 is a perspective view of a digital video camera for professional-use of a shoulder carry type that is an example of the embodiment of an image pickup apparatus of the present invention as viewed from a front side thereof. FIG. 2 is a perspective view of the digital video camera for professional-use shown in FIG. 1 as viewed from a back side thereof.

As shown in FIGS. 1 and 2, in the digital video camera 100 for professional-use of the present embodiment (hereinafter, simply referred to as a camera 100), a replaceable lens part 102 is detachably provided on the front side of a camera main body 101 as an example of an apparatus main body. Furthermore, a battery unit 103 for supplying electric power is detachably provided on a back part of the camera main body 101. A plurality of connectors is provided on a left side surface of the camera main body 101 in a width direction perpendicular to an optical axis of the lens part 102 when the camera main body 101 is viewed from the front side.

Specifically, a D tap connector 104, a wireless communication connector 105, a microphone input connector 106, a lens connector 107, a card connector 108, a USB connector 109, and an HDMI (registered trademark) cable connector 202 are provided.

Likewise, an external monitor connection connector 201, a wired LAN cable connector 203, shooting information output connectors 204, 205, monitors 206, 207, and a return signal connector 208 are provided. Likewise, SDI connectors 209 to 212, a remote control terminal 213, a LANC connector 214, and an audio output stereo connector 215 are provided.

Furthermore, at a lower part of the back part of the camera main body 101, audio output monaural connectors 216, 217, and a power source connector 218 are provided on a lower side of the battery unit 103. The camera 100 of the present embodiment performs shooting while being moved with the camera main body 101 being carried on a shoulder of a person in a state where a cable is connected to each of the connectors that are a plurality of external connection terminals.

As shown in FIG. 1, the D tap connector 104 is a power source connector capable of supplying electric power to an external video light or an external monitor. The wireless communication connector 105 is a connector for connecting thereto a wireless communication unit 502 (see FIG. 5) capable of transferring shooting data by wireless communication.

The microphone input connector 106 is an XLR connector, and makes it possible to, when an external microphone is connected thereto, record voice by transmitting a signal input to the eternal microphone to a main substrate not shown of the camera main body 101 and by subjecting the signal to a predetermined signal processing.

The lens connector 107 is a connector for transmitting a signal from the lens part 102 to the camera main body 101 by connecting thereto a cable for the lens part 102. The card connector 108 is provided with a recording medium inside a cap. The USB connector 109 makes it possible to perform wireless communication by connecting thereto an eternal connection USB.

As shown in FIG. 2, the external monitor connection connector 201 is a connector for connecting an external electronic view finder (EVF), and is capable of outputting video input from the lens part 102 to the EVF by connecting thereto a cable for the EVF.

The HDMI cable connector 202 is a connector for connecting thereto a communication cable for transmitting video and voice, and makes it possible to output the video and voice input from the lens part 102 to an external monitor. The wired LAN cable connector 203 makes it possible to connect to the Internet by connecting thereto a LAN cable.

The shooting information output connectors 204, 205 are each a connector for outputting information obtained during shooting, and capable of outputting information such as time code or GEN-lock by connecting thereto an external apparatus. The monitors 206, 207 are each a connector for outputting video signal input from the lens part 102, and BNC connectors are used in the present embodiment.

The return signal connector 208 is a connector for inputting external information, and makes it possible to display, on a monitor of the camera 100, video being shot by another camera when shooting is performed by using a plurality of cameras, and a BNC connector is used.

The SDI connectors 209 to 212 are each a connector for outputting an SDI signal to an external apparatus, and BNC connectors are used. The remote control terminal 213 makes it possible to, by connecting thereto a remote control unit, operate the camera 100 by outputting a signal input from the remote control unit to the main substrate of the camera main body 101.

The LANC connector 214 makes it possible to operate the camera 100 by connecting thereto a LANC remote controller. The audio output stereo connector 215 is capable of outputting voice recorded on the camera 100 side to an external apparatus by a stereo signal.

Each of the audio output monaural connectors 216, 217 is capable of outputting voice recorded by the camera 100 to an external apparatus by a monaural signal. The audio output monaural connector 216 outputs channel 1 and the audio output monaural connector 217 outputs channel 2. The power source connector 218 is a connector for supplying electric power to the camera 100.

Figure 3:
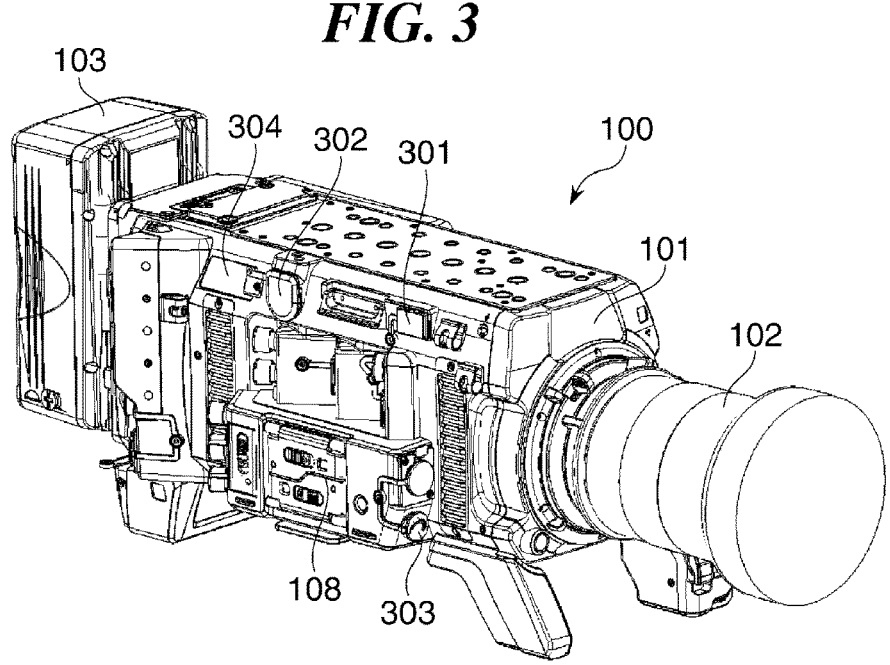
FIG. 3 is a perspective view showing a state where caps and covers are attached to a plurality of connectors of the digital video camera for professional-use shown in FIG. 1.
Figure 4:
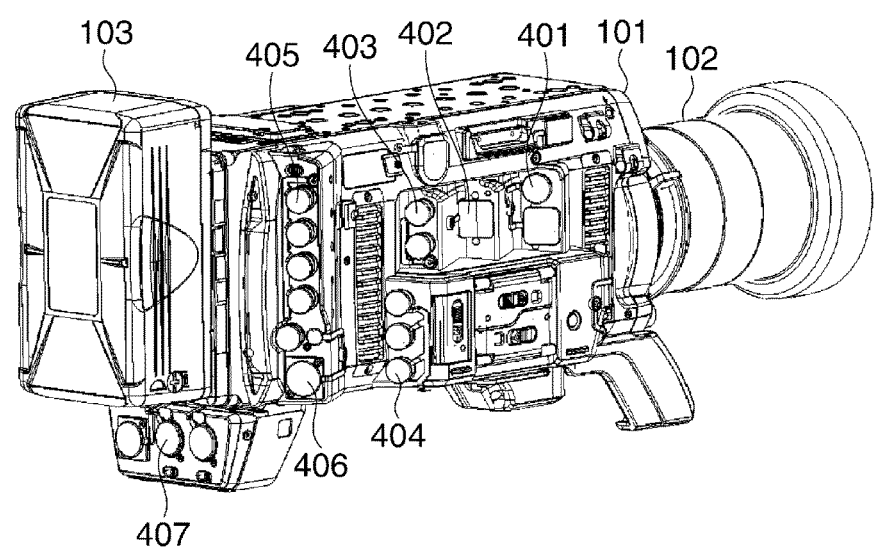
FIG. 4 is a perspective view showing a state where caps and covers are attached to the connectors of the digital video camera for professional-use shown in FIG. 2.

FIG. 3 is a perspective view showing a state where caps and covers are attached to the connectors 104 to 109 of the camera 100 shown in FIG. 1. FIG. 4 is a perspective view showing a state where caps and covers are attached to the connectors 201 to 208 of the camera 100 shown in FIG. 2.

As shown in FIG. 3, a connector cap 301 is detachably attached to the D tap connector 104, and a connector cap 302 is detachably attached to the wireless communication connector 105. A terminal cover 303 has two connector caps and the respective connector caps are attached to the microphone input connector 106 and the lens connector 107. A jack cover 304 covers the USB connector 109 in an openable/closable manner for protection.

As shown in FIG. 4, a jack cover 401 has two connector caps, and the respective connector caps are detachably attached to the external monitor connection connector 201 and the HDMI cable connector 202. A connector cap 402 is detachably attached to the wired LAN cable connector 203. A BNC cover 403 has two connector caps, and the respective connector caps are detachably attached to the shooting information output connectors 204, 205.

A monitor cover 404 has three connector caps, and the respective connector caps are detachably attached to the monitor 206, the monitor 207, and the return signal connector 208. An SDI cover 405 has five connector caps, and the respective connector caps are detachably attached to the SDI connectors 209 to 212 and the remote control terminal 213.

A rear cover 406 has two connector caps, and the respective connector caps are detachably attached to the LANC connector 214 and the audio output stereo connector 215. A rear jack cover 407 has three connector caps, and the respective connector caps are detachably attached to the audio output monaural connector 216, the audio output monaural connector 217, and the power source connector 218.

Figure 5:
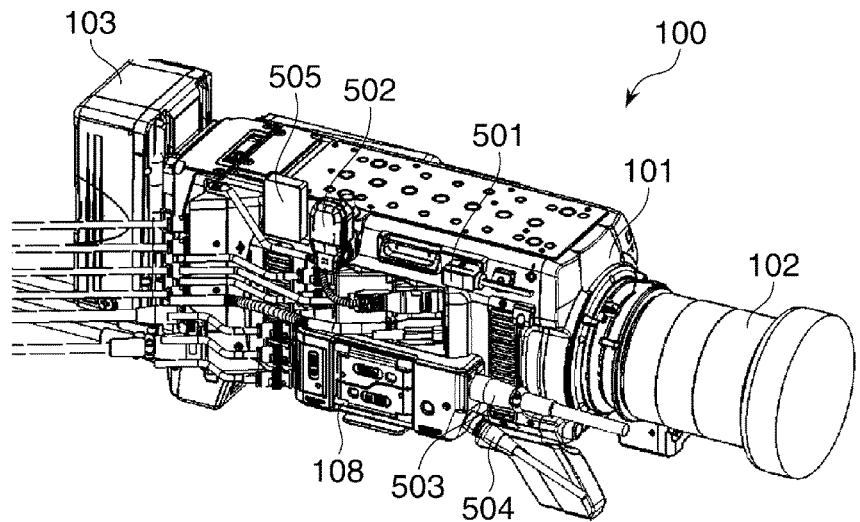
FIG. 5 is a perspective view showing a state where cables or the like are connected to the respective connectors of the digital video camera for professional-use shown in FIG. 1.
Figure 6:
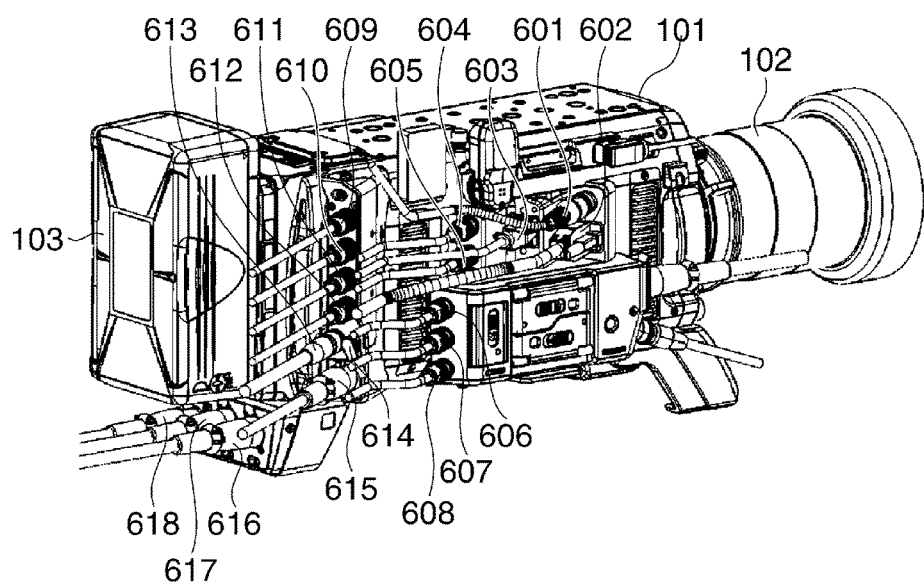
FIG. 6 is a perspective view showing a state where the cables or the like are connected to the respective connectors of the digital video camera for professional-use shown in FIG. 2.

FIG. 5 is a perspective view showing a state where cables or the like are connected to the respective connectors 104 to 109 of the camera 100 shown in FIG. 1. FIG. 6 is a perspective view showing a state where cables or the like are connected to the respective connectors 201 to 208 of the camera 100 shown in FIG. 2.

As shown in FIG. 5, a D tap cable 501 is a cable having an L character shape, and is connected to the D tap connector 104. A wireless communication unit 502 is a unit having an L character shape, and is connected to the wireless communication connector 105. A microphone input cable 503 is connected to the microphone input connector 106.

A lens cable 504 is connected to the lens connector 107. A USB communication unit 505 is a unit having an L character shape, and is connected to the USB connector 109. It should be noted that the protrusion amount of each of the D tap cable 501, the wireless communication unit 502, and the USB communication unit 505 from the camera main body 101 is small, so that possibility of their breakage or the like is low even when they are arranged on the side surface of the camera main body 101.

As shown in FIG. 6, an external monitor connection cable 601 is connected to the external monitor connection connector 201. An HDMI cable 602 is connected to the HDMI cable connector 202. A connector fixing screw is fitted to the HDMI cable 602, and fastening of the connector fixing screw to a screw hole formed on the camera main body 101 makes it possible to prevent breakage or the like of the HDMI cable connector 202.

A wired LAN cable 603 is connected to the wired LAN cable connector 203. A BNC cable 604 is connected to the shooting information output connector 204, and a BNC cable 605 is connected to the shooting information output connector 205. BNC cables 606, 607 are connected to the monitors 206, 207, respectively.

A BNC cable 608 is connected to the return signal connector 208, and BNC cables 609 to 612 are connected to the SDI connectors 209 to 212, respectively. A remote control cable 613 is connected to the remote control terminal 213.

A LANC cable 614 is connected to the LANC connector 214. A 5-pin XLR cable 615 is connected to the audio output stereo connector 215, and 3-pin XLR cables 616, 617 are connected to the audio output monaural connectors 216, 217, respectively. A 4-pin XLR cable 618 is connected to the power source connector 218.

These various cables have a hard part formed of a metal or a resin at a distal end part on a connection side to a corresponding connector, and the hard part has a different length depending on types of the cables.

Figure 7:
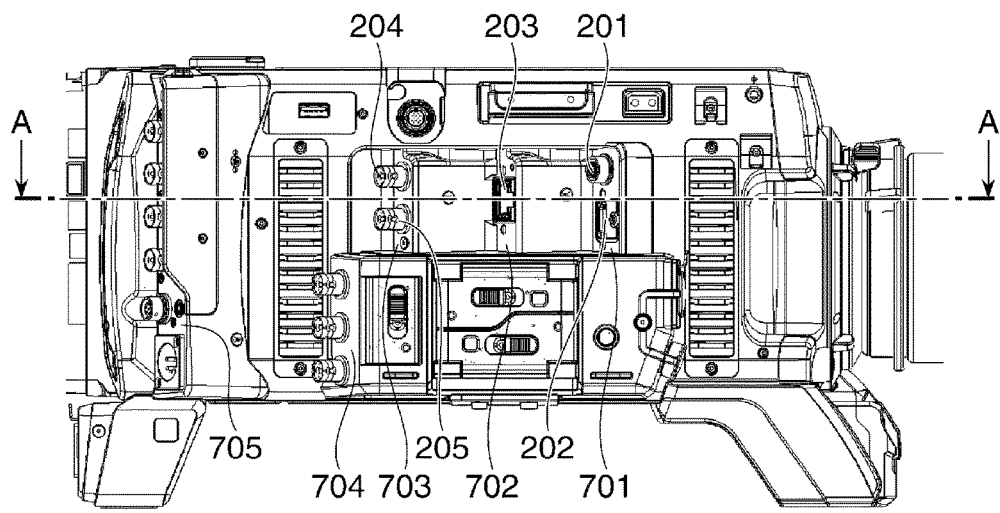
FIG. 7 is a left side view of a camera main body when viewed from the front side thereof.
Figure 8:
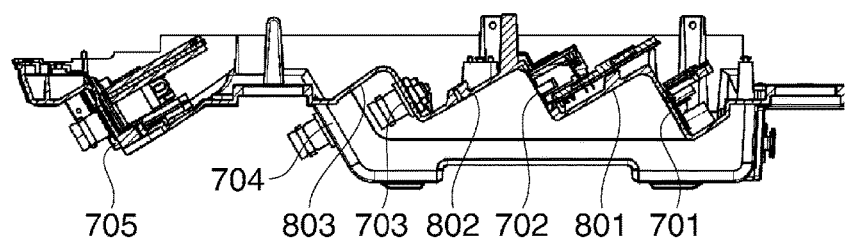
FIG. 8 is a cross sectional view taken along a line A-A of FIG. 7.

FIG. 7 is a left side view of the camera main body 101 when viewed from the front side thereof. FIG. 8 is a cross sectional view taken along a line A-A of FIG. 7. In FIG. 7, on a connector arranged face 701, the external monitor connection connector 201 and the HDMI cable connector 202 are arranged. On a connector arranged face 702, the wired LAN cable connector 203 is arranged.

On a connector arranged face 703, the shooting information output connectors 204, 205 are arranged. On a connector arranged face 704, the monitor 206, the monitor 207, and the return signal connector 208 are arranged. On a connector arranged face 705, the SDI connectors 209 to 212, the remote control terminal 213, the LANC connector 214, and the audio output stereo connector 215 are arranged. These connectors are arranged at positions so as not to protrude from an outermost outline part of the camera main body 101.

Herein, the connector arranged faces 701 to 705 are made to be inclined faces such that an end of each of the connector arranged faces 701 to 705 on the back side of the camera main body 101 (hereinafter, referred to as inside end) is inclined in a direction to come close to the optical axis of the lens part 102. An inclined angle of each of the inclined faces is set at substantially 60° with respect to the optical axis of the lens part 102.

Furthermore, as shown in FIG. 8, the inside end of the connector arranged face 701 and an end of the connector arranged face 702 on a side away from the optical axis of the lens part 102 which is the front side of the camera main body 101 (hereinafter, referred to as outside end) are connected to respective both ends of a connection face 801 at substantially 90°.

Likewise, an inside end of the connector arranged face 702 and an outside end of the connector arranged face 703 are connected to respective both ends of a connection face 802 at substantially 90°. Furthermore, an inside end of the connector arranged face 703 and the camera main body 101 are connected to respective both ends of a connection face 803 at substantially 90°.

This structure makes it possible to prevent a side wall of the camera main body 101 from being an obstacle when the cables are inserted into the connectors arranged on the connector arranged faces 701 to 705.

In addition, the connector arranged faces 701 to 705 are arranged in substantially parallel to one another, and are arranged at positions such that the faces do not overlap to one another when viewed from the left side surface of the camera main body 101 in the width direction perpendicular to the optical axis of the lens part 102. This makes it possible to improve insertion and extraction performance of the cables into and from the respective connectors.

Furthermore, in FIG. 8, when viewed from the optical axis direction of the lens part 102 (front side), the connector arranged faces 701 to 705 are arranged such that the faces overlap. This makes it possible to make the camera main body 101 thin.

Figure 9:
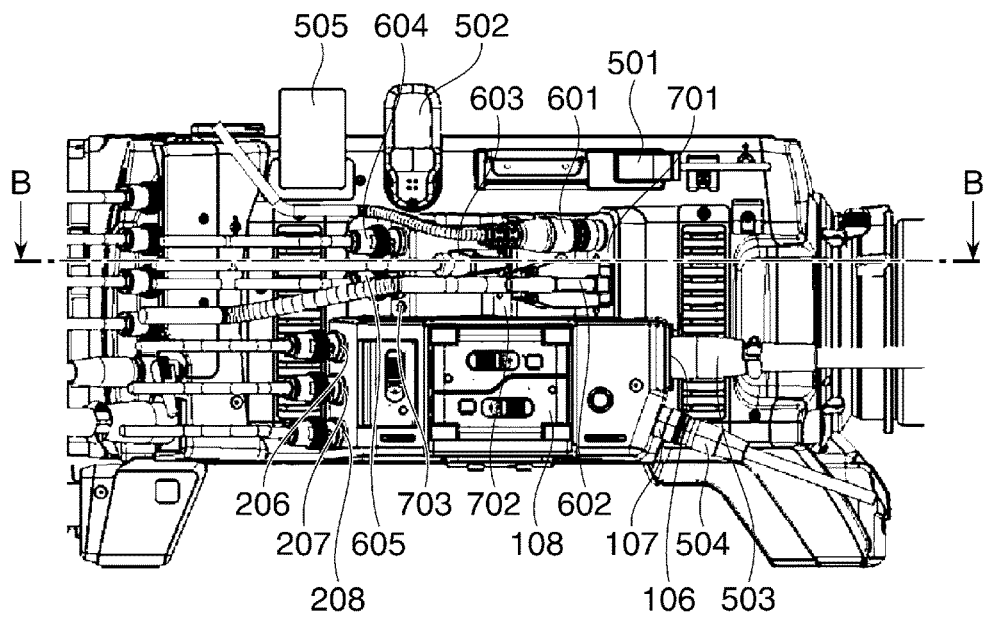
FIG. 9 is a diagram showing a state where cables are connected to the respective connectors arranged on the left side surface of the camera main body when viewed from the front side thereof.
Figure 10:
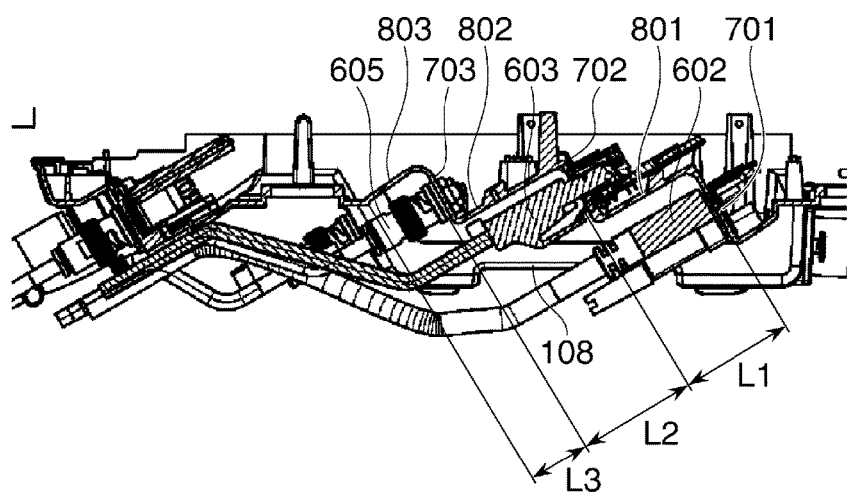
FIG. 10 is a cross sectional view taken along a line B-B of FIG. 9.

FIG. 9 is a diagram showing a state where the cables are connected to the respective connectors arranged on the left side surface when viewed from the front side of the camera main body 101. FIG. 10 is a cross sectional view taken along a line B-B of FIG. 9.

As shown in FIG. 9, the D tap cable 501 is a cable having an L character shape, so that the cable is disposed at a position inclined by 90° with respect to an insertion direction into the D tap connector 104. Consequently, the D tap cable 501 is disposed along the side surface of the camera main body 101.

Furthermore, the wireless communication unit 502 to be connected to the wireless communication connector 105 and the USB communication unit 505 to be connected to the USB connector 109 each have an L character shape with respect to the connector connection parts, so that the units are arranged along a height direction of the camera main body 101.

Furthermore, the microphone input connector 106 to which the microphone input cable 503 is connected, and the lens connector 107 to which the lens cable 504 is connected are arranged so as to face the front side of the camera main body 101.

Furthermore, as shown in FIG. 2 and FIG. 6, the audio output monaural connectors 216, 217 to which the 3-pin XLR cables 616, 617 are connected, respectively, and the power source connector 218 to which the 4-pin XLR cable 618 is connected are arranged so as to face the back side of the camera main body 101. Thus, the connectors do not cause a problem such as their breakage or cable hooking also in a state where the cables and the units are connected.

Furthermore, as shown in FIG. 7 and FIG. 9, the connectors are arranged on the connector arranged faces 701 to 703 closely in the optical axis direction of the lens part 102. For this reason, the two connectors 201, 202 are arranged on the same plane of the connector arranged face 701 that is arranged nearest to the front side.

Furthermore, on the connector arranged face 702 between the connector arranged face 701 and the connector arranged face 703 arranged nearest to the back side, one connector 203 is arranged at a position between the connectors 201, 202. Furthermore, on the connector arranged face 703, the two connectors 204, 205 are arranged so as to be deviated with respect to the connector 203 in the height direction of the camera main body 101.

In this manner, the connectors on the connector arranged faces 701 to 703 are arranged so as to be alternately deviated in the height direction of the camera main body 101, making it possible to dispose the cables so as not to be overlapped to each other when the cables are disposed in a straight manner. This improves insertion and extraction performance of the cable into and from the connector.

As shown in FIG. 10, the connector 202 to which the HDMI cable 602 is connected, the connector 203 to which the wired LAN cable 603 is connected, and the connector 205 to which the BNC cable 605 is connected are arranged in substantially parallel to the connection faces 801 to 803, respectively. This prevents a surrounding shape from becoming an obstacle during insertion/extraction of the cables.

Furthermore, the length L1 of the connection face 801, the length L2 of the connection face 802, the length L3 of the connection face 803 are set so as to be substantially same as or longer than lengths of the hard parts of the cables to be inserted into the connectors arranged on the connector arranged faces 701 to 703, respectively. This makes, when the cables are pushed in a bend direction, the pushed force be received by the connection faces 801 to 803.

Furthermore, making the lengths L1 to L3 of the connection faces 801 to 803 substantially same as the lengths of the hard parts of the cables prevents the cables adjacent to each other from becoming obstacles during insertion/extraction of the cables to/from the connectors arranged on the connector arranged faces 701 to 703.

Furthermore, the hard part of the cable is arranged inside the card connector 108 in the width direction of the camera main body 101, preventing breakage of the cable or the connector even when the side surface of the camera main body 101 in the width direction collides with an obstacle such as a wall.

As described above, the present embodiment makes it possible to prevent hooking or disconnection of the cable without lowering insertion and extraction performance of the cable into and from the connector even when the connectors are arranged on the side surface of the camera main body 101 while reducing the thickness of the camera main body 101 in its width direction. This makes it possible to prevent breakage of the connector and coming off of the cable.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-202785, filed Oct. 14, 2015 which is hereby incorporated by reference herein in its entirety.

What is claimed is:

1. An image pickup apparatus comprising:
a plurality of inclined faces formed on a side surface in a width direction of an apparatus main body perpendicular to an optical axis, the plurality of inclined faces being inclined such that ends of the respective inclined faces on a back side of the apparatus main body are inclined in a direction to come close to the optical axis; and
a plurality of external connection terminals provided on the respective plurality of inclined faces,
wherein the plurality of inclined faces are arranged at positions so as not to overlap each other when viewed from the width direction of the apparatus main body, and are arranged at a position such that at least a part of the inclined faces overlap each other when viewed from a direction of the optical axis, and
wherein the number of external connection terminals provided on a first inclined face among the plurality of inclined faces is different from the number of external connection terminals provided on a second inclined face, among the plurality of inclined faces, other than the first inclined face.

2. The image pickup apparatus according to claim 1, wherein inclined angles of the respective inclined faces with respect to the optical axis are substantially the same.

3. The image pickup apparatus according to claim 1, wherein the plurality of external connection terminals provided on the respective plurality of inclined surfaces are arranged at positions so as not to protrude from an outermost outline part of the apparatus main body.

4. An image pickup apparatus comprising:
a plurality of inclined faces formed on a side surface in a width direction of an apparatus main body perpendicular to an optical axis, the plurality of inclined faces being inclined such that ends of the respective inclined faces on a back side of the apparatus main body are inclined in a direction to come close to the optical axis; and a plurality of external connection terminals provided on the respective plurality of inclined faces, wherein the plurality of inclined faces are arranged at positions so as not to overlap each other when viewed from the width direction of the apparatus main body, and are arranged at a position such that at least a part of the inclined faces overlap each other when viewed from a direction of the optical axis, and wherein shapes or sizes of external connection terminals provided on one of the plurality of inclined faces are different from each other.

5. The image pickup apparatus according to claim 4, wherein inclined angles of the respective inclined faces with respect to the optical axis are substantially the same.

6. The image pickup apparatus according to claim 4, wherein the plurality of external connection terminals provided on the respective plurality of inclined surfaces are arranged at positions so as not to protrude from an outermost outline part of the apparatus main body.

7. An image pickup apparatus comprising:

a plurality of inclined faces formed on a side surface in a width direction of an apparatus main body perpendicular to an optical axis, the plurality of inclined faces being inclined such that ends of the respective inclined faces on a back side of the apparatus main body are inclined in a direction to come close to the optical axis; and a plurality of external connection terminals provided on the respective plurality of inclined faces, wherein the plurality of inclined faces are arranged at positions so as not to overlap each other when viewed from the width direction of the apparatus main body, and are arranged at a position such that at least a part of the inclined faces overlap each other when viewed from a direction of the optical axis, wherein the number of external connection terminals provided on a first inclined face among the plurality of inclined faces is different from the number of external connection terminals provided on a second inclined face, among the plurality of inclined faces, other than the first inclined face, and wherein shapes or sizes of external connection terminals provided on one of the first and second inclined faces are different from each other.

8. The image pickup apparatus according to claim 7, wherein inclined angles of the first and second inclined faces with respect to the optical axis are substantially the same.

9. The image pickup apparatus according to claim 7, wherein the plurality of external connection terminals provided on the respective plurality of inclined surfaces are arranged at positions so as not to protrude from an outermost outline part of the apparatus main body.

* * * * *